(12) United States Patent
Axelrod

(10) Patent No.: US 7,021,242 B2
(45) Date of Patent: Apr. 4, 2006

(54) FOLDABLE/COLLAPSIBLE STRUCTURE

(75) Inventor: Glen S. Axelrod, Colts Neck, NJ (US)

(73) Assignee: T.F.H. Publications, Inc., Neptune City, NJ (US)

( * ) Notice: Subject to any disclaimer, the term of this patent is extended or adjusted under 35 U.S.C. 154(b) by 0 days.

(21) Appl. No.: 10/741,054

(22) Filed: Dec. 19, 2003

(65) Prior Publication Data
US 2005/0132973 A1     Jun. 23, 2005

(51) Int. Cl.
*A01K 29/00*     (2006.01)
(52) U.S. Cl. .................................. 119/496; 119/498
(58) Field of Classification Search ............... 119/473, 119/474, 496, 497, 498, 499, 495; D30/109; 190/39, 107, 116, 117, 101; 224/278, 290, 224/6; 220/6; 52/27, 36.1, 36.5, 64, 67, 52/69, 71
See application file for complete search history.

(56) References Cited

U.S. PATENT DOCUMENTS

| | | | | |
|---|---|---|---|---|
| 2,079,458 A | * | 5/1937 | Leichtfuss | 119/497 |
| 3,043,264 A | * | 7/1962 | Felhofer et al. | 119/497 |
| 3,527,339 A | * | 9/1970 | Cipolla | 206/290 |
| 3,527,340 A | * | 9/1970 | Cipolla | 206/278 |
| 4,484,540 A | | 11/1984 | Yamamoto | 119/19 |
| 4,576,116 A | | 3/1986 | Binkert | 119/19 |
| 4,655,329 A | * | 4/1987 | Kaneko | 190/107 |
| 4,903,637 A | | 2/1990 | Devault | 119/19 |
| 4,951,816 A | * | 8/1990 | Smith | 190/107 |
| 5,078,442 A | * | 1/1992 | Rau et al. | 52/69 |
| 5,133,294 A | | 7/1992 | Reid | 119/96 |
| 5,331,777 A | * | 7/1994 | Chi-Yuan | 52/64 |
| 5,335,618 A | | 8/1994 | Zarola | 119/19 |
| 5,425,681 A | | 6/1995 | Van Hook | 474/263 |
| 5,444,944 A | * | 8/1995 | Roelofsz | 52/64 |
| 5,524,789 A | * | 6/1996 | Jackman | 220/6 |
| 5,549,073 A | * | 8/1996 | Askins et al. | 119/474 |
| 5,564,599 A | * | 10/1996 | Barber et al. | 220/6 |
| 5,590,748 A | * | 1/1997 | Chang | 190/39 |
| 5,669,331 A | | 9/1997 | Richmond | 119/497 |
| 5,761,854 A | * | 6/1998 | Johnson et al. | 52/69 |
| 5,769,028 A | | 6/1998 | Deckys | 119/496 |
| 5,839,392 A | | 11/1998 | Pemberton et al. | 119/498 |
| 5,904,262 A | * | 5/1999 | Coppi | 220/7 |
| 5,950,568 A | | 9/1999 | Axelrod et al. | 119/499 |

(Continued)

OTHER PUBLICATIONS

U.S. Appl. No. 10/348,995, filed Jan. 22, 2003, Axelrod.

(Continued)

*Primary Examiner*—Teri Pham Luu
*Assistant Examiner*—Elizabeth Shaw
(74) *Attorney, Agent, or Firm*—Grossman, Tucker, Perreault & Pfleger, PLLC

(57) ABSTRACT

The present invention relates to a foldable/collapsible structure that folds and collapses between an open and closed condition. The structure includes a top and bottom section, and a plurality of collapsible wall sections extending between said top and bottom sections. The wall sections and the top and bottom sections define an enclosure and also contain a longitudinal member extending between said top and bottom section. The longitudinal member contains a pivot connection at a location between the top and bottom section. The pivot section allows movement of the top and bottom section relative to one another, so that the foldable/collapsible structure can be configured between an open or closed condition.

18 Claims, 7 Drawing Sheets

U.S. PATENT DOCUMENTS

| | | | | |
|---|---|---|---|---|
| 6,131,534 | A | 10/2000 | Axelrod | 119/499 |
| 6,216,638 | B1 | 4/2001 | Pivonka et al. | 119/498 |
| 6,345,591 | B1* | 2/2002 | Richmond | 119/497 |
| 6,367,603 | B1* | 4/2002 | Tiramani et al. | 190/39 |
| 6,408,797 | B1 | 6/2002 | Pivonka et al. | 119/498 |
| 2002/0062605 | A1* | 5/2002 | Matthews | 52/69 |
| 2004/0140305 | A1* | 7/2004 | Okumura | 220/6 |
| 2004/0222222 | A1* | 11/2004 | Parnall et al. | 220/6 |

OTHER PUBLICATIONS

Four Paws K-9 Keeper Dog Crate; Print-out of Directions for Assembling the Deluxe Series; Four Paws Products Ltd., Hauppauge, NY 11788 (1 pg).

Petmate Collapsible Kennel; Flyer of "Assembly Instructions"; Petmate, P.O. box 1246, Arlington, TX 76004-1246 (2 pgs).

* cited by examiner

FOLDABLE/COLLAPSIBLE STRUCTURE

FIELD

The invention herein generally relates to a pet carrier transportation device and in particular to a collapsible/foldable pet carrier or portable structure that can be readily converted into a compact condition for ease of storage or transport. In addition, but not by way of limitation, the invention herein relates to a collapsible pet carrier that provides stability of construction and collapsible functionality.

BACKGROUND

A variety of pet carriers have been reported in the prior art, all aimed in one form or another to facilitate pet transportation. Specifically, pet carriers are commonly used by pet owners for carrying their pets on trips or as a means for containing the pets when the pets are shipped from one point to another. Pet carriers also commonly double as sleeping quarters for the pet as the owner may contain the pet overnight to prevent the pet from wandering and potentially damaging the home or hotel room in which the owner is occupying.

Attention is first directed to U.S. Pat. No. 6,131,534, and the art cited therein, which patent is assigned to TFH Publications, Inc, and which is directed in one embodiment to a pet carrier/portable habitat structure for containing a pet comprising a bottom panel containing a floor surface, along with the use of a top panel, a left panel, a right panel and a first end panel and a second end panel. The first and second end panels are releasably engaged to said carrier and the left and right panels each comprise an upper and lower section hingedly connected to one another so as to collapse the left and right panels inwardly into said pet carrier. The carrier may include a perforated tray removably placed within the bottom panel including openings to allow for passage of liquids into the bottom panel, along with supports positioned between the tray and the bottom panel to maintain the tray above the floor surface of the bottom section.

Reference is also made to U.S. Pat. No. 5,950,568, and the art cited therein, which patent is also assigned to TFH Publications Inc., and which is directed in one embodiment to a collapsible/foldable structure comprising a top roof and a bottom platform and front and rear collapsible walls each pivotally attached to the bottom platform. The structure further contains a pair of sidewalls each pivotally attached to said roof to facilitate inward collapse of said sidewalls when said sidewalls are pivoted toward said bottom platform. Furthermore, the top roof section may contain two roof sections pivotally attached to one another at about the mid-point of the two roof sections, so that the two roof sections can collapse downwardly along their pivotable attachment toward the bottom platform.

Reference is next made to U.S. patent application Ser. No. 10/348,995 entitled Roll-Top Pet Carrier, filed Jan. 22, 2003, and the art cited therein, also assigned to TFH Publications Inc. This application stands directed in one embodiment at a carrier for pets with slidable roll-away sides that retract into a base along with ends that fold down and a handle for carrying. The carrier is described as being preferably made of plastic which allows for light weight, lower cost, and easier cleaning.

Further review of the patent literature begins with U.S. Pat. No. 5,769,028, entitled "Pet Carrier" which discloses a carrier including a main unit and an insert unit. The main unit defines a carrying space having a closed bottom and four sides, one of which has an opening therethrough large enough to permit an animal to enter the space through the opening, and the insert unit has a closed top, four sides, and an open bottom. After the animal has entered the main unit, the insert unit is lowered down into the main unit to close off the side opening. Then a foldable top closure for the main unit is folded to secure the carrier and form a handle structure for carrying the carrier. Both units are foldable and are structured to provide an enhanced strength carrier.

U.S. Pat. No. 5,839,392, entitled "Pet Carrier" discloses a corrugated plastic pet carrier with two side panels. A side panel fold line extends between the base panel and each side panel. In addition, a diagonal fold line is said to extend from each corner of the base panel to a first median fold line for collapsing the base panel, side panels and end panels inwardly for collapsing the container from an erect position to a collapsed, generally flat position, and back to an erect position.

U.S. Pat. No. 5,133,294, entitled "Pet Carrier for Vehicles" discloses a pet carrier for use in a vehicle comprising a platform sized to generally fit on the passenger seat. Front, rear and side panels are pivotally connected to the platform for movement between generally horizontal positions and upright positions wherein they form a pet enclosure upstanding from the platform.

U.S. Pat. No. 4,903,637 discloses what is termed a "container" to house or carry-small household pets, which may be quickly and manually formed between an erected use mode and a flat folded storage mode. The container is of a gable roofed house configuration in its erected mode and comprises an interconnected structure formed by hingeably related rigid planar elements that occupy a relatively small volume in the folded storage mode. Handles carried by the roof provide aid in manual carriage, and releasable fasteners maintain either an erected or storage mode, and en end wall provides a selectively latchable door.

U.S. Pat. No. 4,576,116 discloses a collapsible A-frame house providing a common site for a cat to rest, exercise and play comprised of a roof of carpet-like material including two integral roof panels with their bottom edges connected to opposing edges of a floor panel also of a carpet-like material. Stiffening panels are affixed onto the backside of the roof panels. A cord with two ends slidably passes through the peak into the house, with cat amusement objects connected to each end. The cord additionally provides a manual handle for lifting the house. Collapsing the house for storage or transport, the house is initially lifted by the cord adjacent the peak. The flexible nature of the floor panels permits an outward folding or buckling of the floor along its longitudinal centerline to thereby completely collapse the house into a folded condition.

U.S. Pat. No. 5,335,618 discloses a collapsible animal enclosure comprising a house unit with spaced side walls and a roof of pliable material, and opposite ends forming an enclosed area for housing an animal. Support bows extend transversely across the sidewalls and roof for holding the sidewalls and roof in an open, spread apart condition. The house unit can be collapsed between a fully erect condition and a collapsed condition in which the ends are pushed inwardly towards one another, collapsing a pliable material between the ends in an accordion-folded manner.

U.S. Pat. No. 5,425,681 discloses an animal house, including a cap, a base, four posts and four walls secured together. Both the cap and base include a groove formed in the inner peripheral portion, and the posts each include two slots for engaging with the edges of the walls so as to solidly secure the walls in place. The animal house may be folded into a compact configuration.

Finally, as it relates to background art concerning pet carriers, attention is also directed to U.S. Pat. No. 4,484,540 entitled, "Collapsible, Portable Domestic Pet Cage", which discloses a collapsible, portable domestic pet cage for carrying with a pet keeper such domestic pets as dogs, cats and the like, wherein bent portions of the cage can be readily constructed using any connection means and fixing means, and when collapsed dimensionally in small form, the whole circumferential walls of the cage is accommodated between vertical walls of a ceiling plate and erected walls of a receptacle plate or dish so as to be made dimensionally in a small size.

SUMMARY

In a first non-limiting embodiment, the present invention relates to a foldable/collapsible structure that folds and collapses between an open and closed condition. The structure includes a top and bottom section, and a plurality of collapsible wall sections extending between said top and bottom sections. The wall sections and said top and bottom sections define an enclosure and also contain a longitudinal member extending between said top and bottom section, said longitudinal member containing a pivot connection at a location between said top and bottom section. The pivot section allows movement of the top and bottom section relative to one another, so that the foldable/collapsible structure can be configured between an open or closed condition.

In a second non-limiting embodiment, the present invention relates to a foldable/collapsible structure that folds and collapses between an open and closed condition. The structure comprises a first sub-assembly and an upper portion longitudinal member pivotally coupled to said first sub-assembly. A second sub-assembly is provided comprising a bottom and a lower portion longitudinal member pivotally coupled to said second sub-assembly. A plurality of collapsible wall sections extend between the first and second sub-assembly, wherein the wall sections and the first and second sub-assembly define an enclosure. The upper portion longitudinal member is configured to pivotally couple to the lower portion longitudinal member to allow movement of the top and bottom section relative to one another, so that the foldable/collapsible structure can be configured between said open or closed condition.

BRIEF DESCRIPTION OF THE DRAWINGS

Features and advantages of the present invention will be clear from the following description of exemplary embodiments consistent with the present invention, which description should be considered in conjunction with the accompanying drawings, wherein.

DESCRIPTION OF THE PREFERRED EMBODIMENTS

The foldable/collapsible structure of the present invention is described herein in the context of the particular exemplary and preferred embodiment of a foldable/collapsible pet carrier consistent with the present invention. While the illustrative embodiment of the foldable/collapsible structure is in the form of a pet carrier it should be understood that the features and advantages of the present invention may have application in numerous alternative structures. For example, the present invention may be embodied in foldable/collapsible structures including storage containers, animal habitats, coolers or ice chests, etc. Those skilled in the art will recognize and appreciate many applications of the present invention beyond those mentioned herein. The forgoing list should not, therefore, be construed as limiting the application of the present invention.

Figure 1:
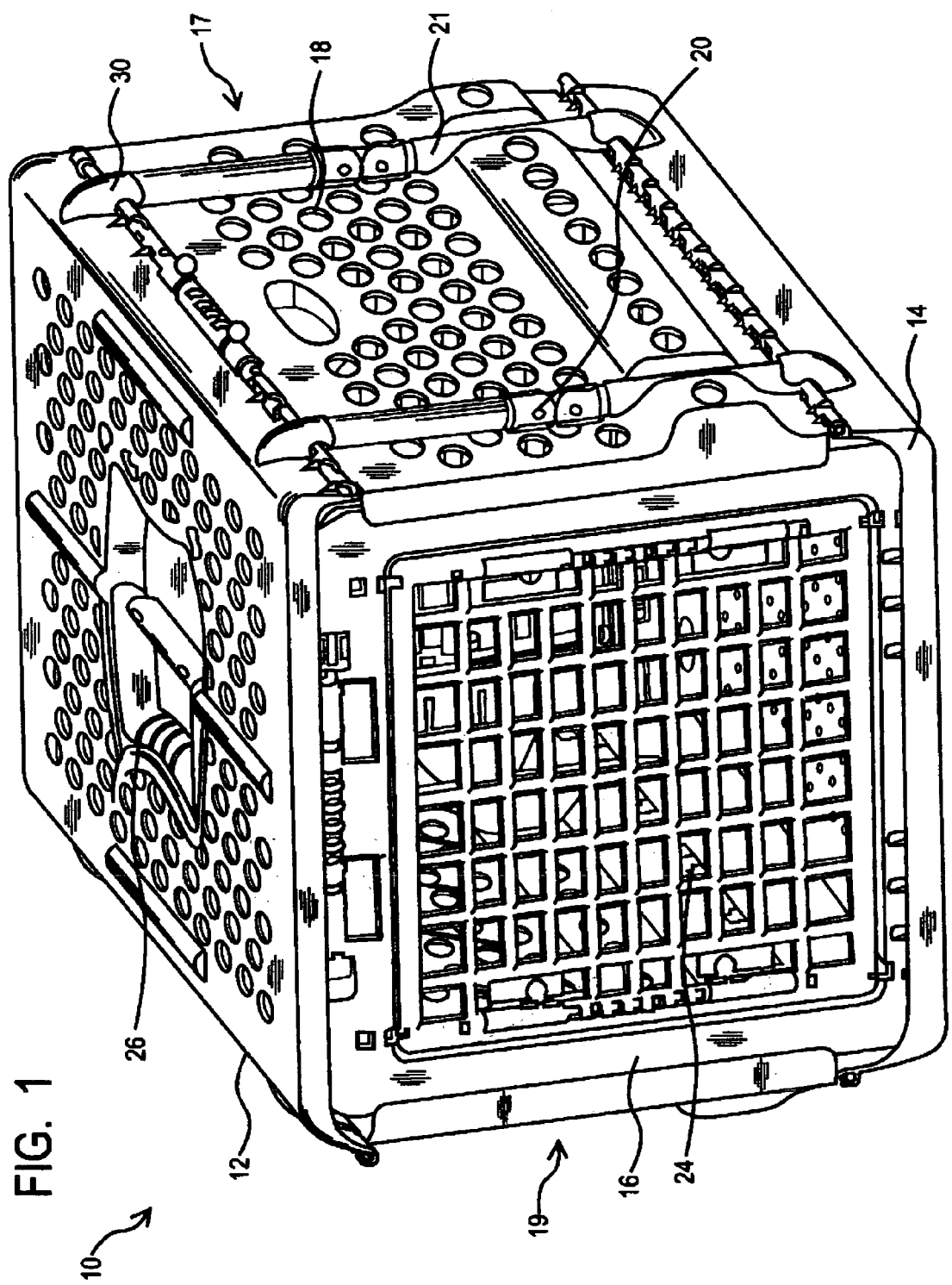
FIG. 1 is a perspective view of an exemplary pet carrier consistent with the present invention.

Referring to FIG. 1, a foldable/collapsible pet carrier 10 consistent with the present invention may be provided in the general form of a rectangular box. As such, the pet carrier 10 generally includes a top 12 and bottom 14, as well as four collapsible walls 16–19, each generally extending between the top 12 and bottom 14 of the pet carrier 10. For the ease of explanation, the walls 16–19 may be discussed as being a front wall 16, rear wall 17, and two opposed side walls 18, 19; however, such designations are not intended to connote any limiting attributes.

The carrier 10 preferably includes longitudinal members 20, 21, 22, 23 (see FIGS. 1 and 3) discussed in more detail below, extending between the bottom 14 and top 12 of the carrier 10. The longitudinal members 20–23 may be preferably disposed two on each of a pair of opposed walls, e.g., walls 18, 19, of the carrier 10. Consistent with the use as a pet carrier 10, the walls 16–19, and even top 12 and bottom 14 may include perforations, holes, or mesh panels, thereby providing ventilation and visibility for any animal to be contained in the carrier 10. In addition, the walls and top and bottom may be made such that they insulate and provide for more uniform temperature regulation.

The pet carrier 10 may also include a door 24 in the front wall 16, although a door may optionally be placed in any of the walls 16–19 or even in the top 12. Advantageously, a handle 26 may be provided on the top 12 to facilitate transportation of the carrier 10. In larger embodiments, or those intended for containing relatively heavy contents, multiple handles may be provided on the top 12, or any or all of the walls 16–19.

Figure 2:
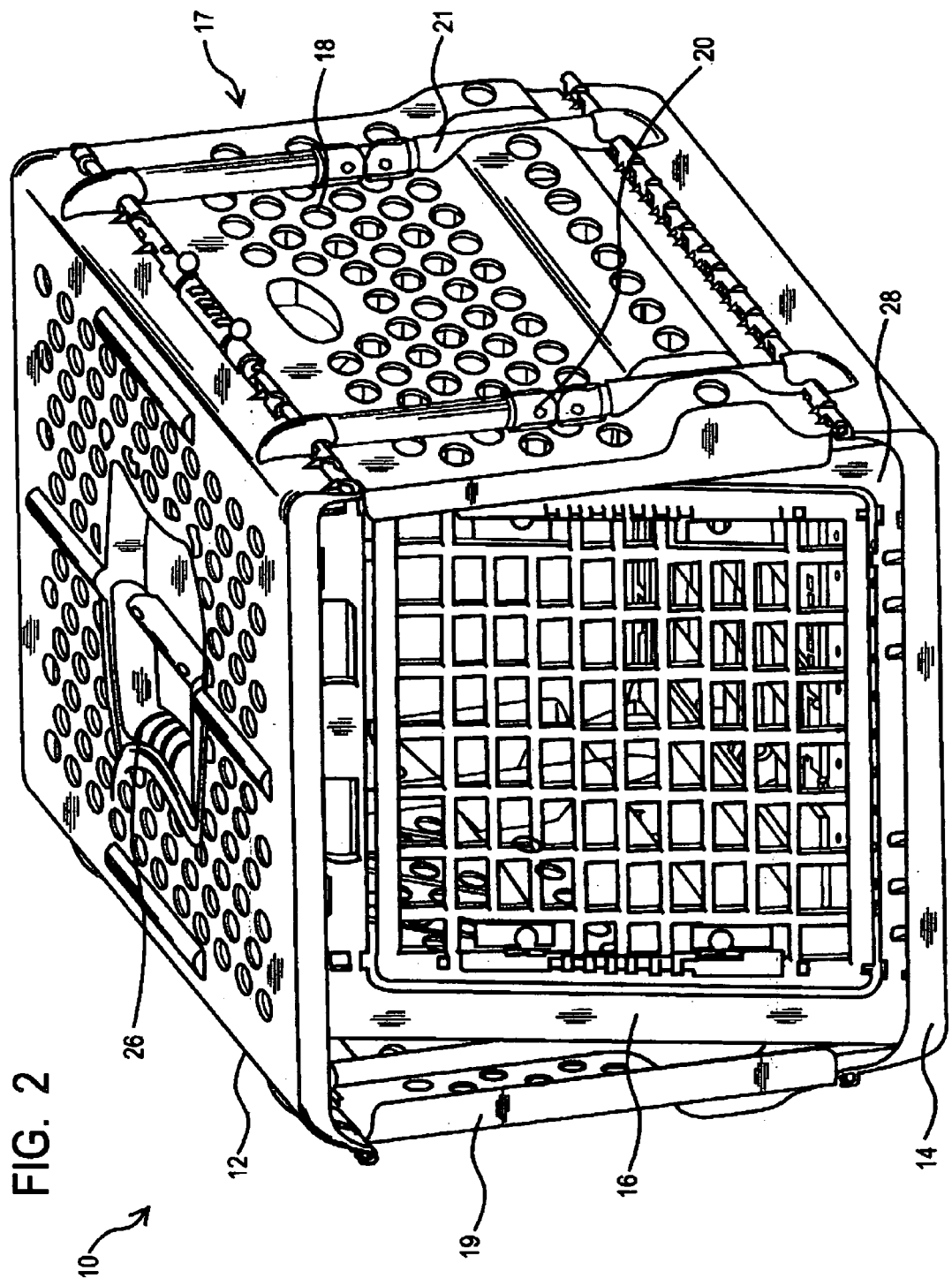
FIG. 2 illustrates one exemplary embodiment of the folding or collapsing front and rear walls.
Figure 3:
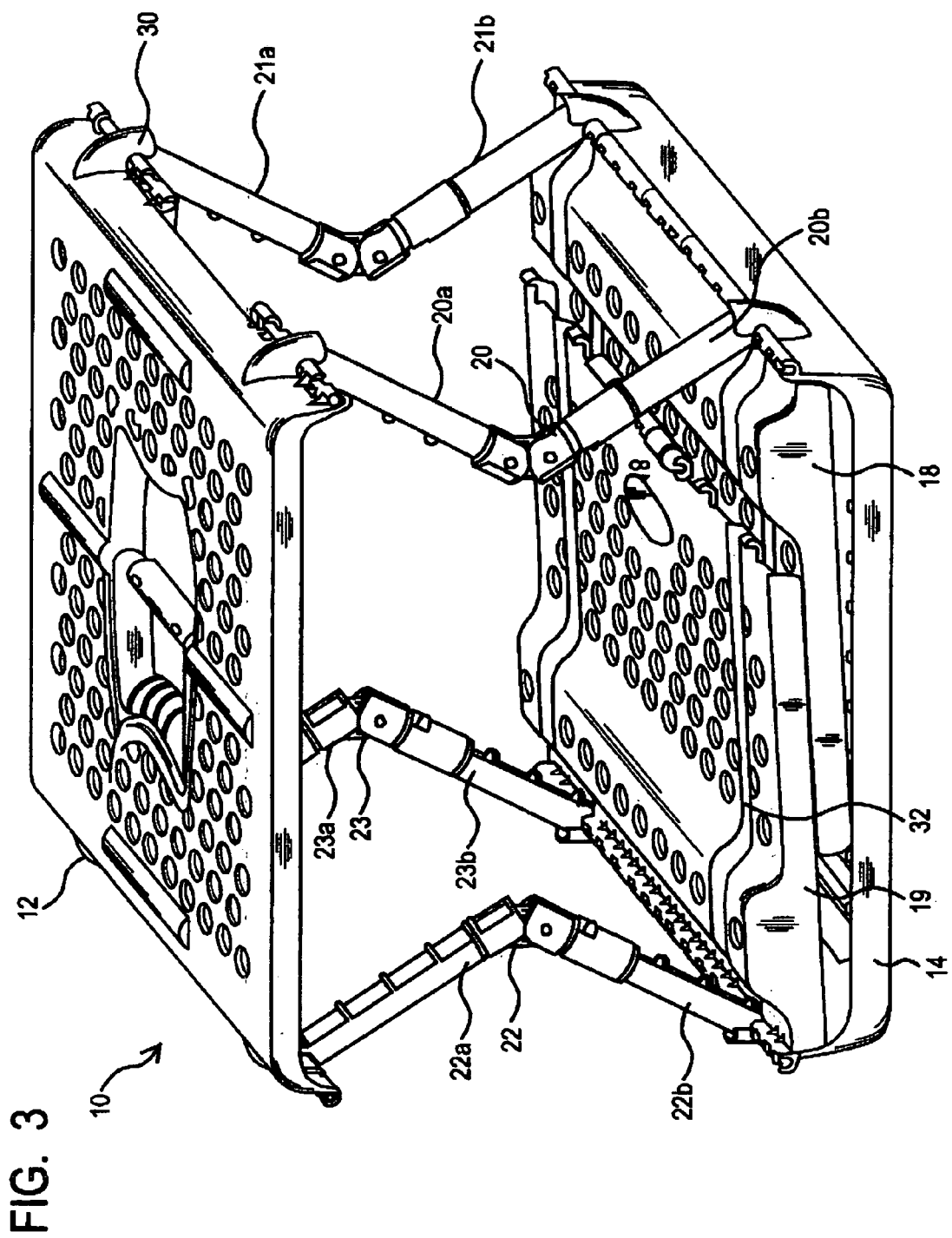
FIG. 3 illustrates the exemplary pet carrier with the walls collapsed and folded.

Turning next to FIGS. 2 and 3 the collapsing or folding aspect of a preferred aspect of the invention is illustrated. As first shown in FIG. 2, the front wall 16 may be folded inwardly toward the bottom 14 of the carrier 10. Advantageously, the front wall 16 may be collapsed completely flat onto the bottom 14 of the carrier 10. The inward folding and collapsing of the front wall may be accomplished by providing the bottom edge of the front wall 16 and the associated region of the bottom 14 with an integrated, cooperating, hinge features 28 extending along the entirety or at least a portion of the bottom edge of the front wall 16. The hinge features 28 allow the front wall 16 to pivot inwardly about its bottom edge. As an alternative to the integrated hinge features 28 of front wall 16 and the bottom 14, a separate hinge may be disposed between the front wall 16 and bottom 14 to permit the pivotal displacement of the front wall. In addition, it is contemplated that the front wall 16 may be hingedly connected to the bottom 14 via a plastic or living hinge type feature, such plastic living hinge preferably made of a polyolefin polymer, such as polypropylene as well as other polymer materials suitable for repeated flexing in a hinge type application. In addition, it is contemplated that the front wall 16 may be optionally hinged to the side walls 18 and 19, together with or exclusive of a hinge type attachment to the bottom 14. In addition, the front wall 16 may optionally be hinged to the top section 12. Furthermore, it is contemplated herein that the front wall 16 may be removably attached to the pet carrier 10 thereby allowing for its complete removal for the purposes of collapsing the carrier as described more fully herein. Such removed wall also may be conveniently stored within the bottom 14 of the carrier, or elsewhere, according to consumer preference.

In a similar fashion to the front wall 16, the remaining walls 17–19 may also be folded inward toward the bottom 14 of the carrier 10 in a manner that is similar to the front wall 16. While not a requirement, the walls 16–19 may all be preferably stacked flat upon each other in any desired sequence within the bottom 14 to achieve one of a number of compact configurations. Expanding upon this optional feature, when stacking the walls 16–19 flatly upon each other, the thickness of each wall 16–19 may be considered and selectively adjusted. Furthermore, another way of ensuring that the walls 16–19 lie flat is to, e.g. stagger the location of the of pivot point of each wall 16–19 such that, when folded to a horizontal posture, the interior surface of each wall 16–19 will rest substantially on the exterior surface of a previously folded wall. Staggering the pivot point for each wall may be achieved, for example, by providing upwardly extending vertical sections from the bottom 14 associated with each respective wall 16–19. The upwardly extending vertical sections may therefore be adjusted in height such that the pivot point or hinge location of each wall 16–19 can be conveniently altered. It should also be appreciated that the order in which the walls 16–19 are inwardly folded may be varied as another design choice, with the overall preferred result that the walls 16–19 can be made to lie substantially flat within the carrier 10.

Consistent with the above, and as an initial consideration of the collapsibility features of the carrier 10, it is expressly contemplated that the four walls 16–19 may be pivotally coupled to the top 12 and/or bottom 14 and/or to one another and such that walls are all collectively configured to inwardly collapse into the carrier 10. Alternatively, rather than being pivotally coupled to either the top 12 and/or the bottom 14, the walls 16–19 may all be detachable from both the top 12 and/or the bottom 14 of the carrier 10. In such an optional embodiment, the four walls 16–19 may all be completely disengaged from the top 12 and bottom 14 and be positioned and stored in a generally stacked arrangement on the bottom 14. The top 12 may then be collapsed onto the stacked walls 16–19 (as discussed more fully below) thereby retaining the walls 16–19 between the top 12 and the bottom 14. Of course, the top 12 may simply be collapsed onto the bottom 14 and the walls 16–19 may otherwise be stored, either with the collapsed top 12 and bottom 14, or at a separate location.

It is worth noting that in the optional embodiment in which the walls 16–19 are detachable and disengaged from the top 12 and bottom 14, it is preferred to releasably retain/lock the walls 16–19 to the top 12 and/or bottom 14 when the carrier 10 is in an expanded or assembled configuration. The walls 16–19 may be releasably retained/locked using conventional detents, sliding locks, snap-fits, pins, mechanical fasteners, etc. which will readily be appreciated by those having skill in the art. Alternatively, the walls 16–19 may be also be secured and locked to one another, along their vertical edge, rather than to the top 12 or the bottom 14. Optionally, the walls may also be releasably retained/locked to both the top 12 and bottom 14 as well as to one another. According to such optional variations, when assembled the walls 16–19 become selectively and strategically secured to one another thereby assisting in maintaining the structure in an opened and mechanically stabilized configuration. However, residing behind this capability to provide a mechanically stabilized configuration, the pet carrier 10 may still be conveniently disassembled.

FIG. 3 illustrates the exemplary pet carrier 10 with all of the walls 16–19 now folded inwardly onto the bottom 14 of the carrier 10. In this particularly preferred embodiment, the walls 16–19 were all hingedly connected to the bottom 14 such that they can be, as illustrated, made to inwardly collapsed. However, it can be appreciated that in FIG. 3 only walls 18 and 19 appear, as 16 and 17 rest beneath walls 18 and 19 in such collapsed state. In addition, with respect to wall 19, it can be seen that preferably, such wall contains a pair of what can be termed recesses or channels 32 to accommodate, e.g., longitudinal member 22. Any geometrical shape is possible for such recesses or channels. Such geometrical shape may be made to generally match or differ with the geometrical shape of the longitudinal members 20–23. As illustrated, the geometrical shape of the recess or channels 32 is preferably semi-circular, and the longitudinal members are also preferably circular in shape thereby providing a generally mating fit between such features of the carrier. Furthermore, it can be appreciated that longitudinal member 20b may rest within a portion of the recess or channel 32 on wall 18, and a portion of the recess or channel 32 on wall 19.

In addition, the number of recess or channels in walls 16–19 can be made to vary to accommodate as many longitudinal members that one may elect to employ to provide the exemplary collapsible characteristics. Such recess or channels may also be made to vary in depth, such that the longitudinal members may or may not protrude from the exterior surface of walls, as illustrated by consideration of the thickness at any particular location of the wall 18 and longitudinal member 20 shown in FIG. 1. Indeed, as shown in FIG. 1, wall 18 includes thicker section 18a, preferably and selectively positioned at the base of such wall. Such thicker wall surface sections may be positioned anywhere on the walls 16–19, and in any number. Furthermore, as illustrated, the longitudinal member 20 may optionally be positioned within and beneath the wall surface when passing through the thicker section 18a.

As shown in FIG. 3, the top 12, which is in a partially collapsed stated, is supported from the bottom 14 by the four longitudinal members identified generally as 20–23. As shown, each of the longitudinal members 20–23 may include upper portions 20a–23a and lower portions 20b–23b. The upper 20a–23a and lower 20b–23b portions are pivotally coupled to each other. The pivotal coupling of the upper 20a–23a and lower 20b–23b portions allow the longitudinal members 20–23 to collapse or fold inwardly as shown and align and rest in the recess or channels 32. Consistent with the invention herein, the pivotal coupling of the upper 20a–23a and lower 20b–23b portions of the longitudinal members 20–23 may have various configurations of hinges, articulated joints, etc., as will be readily understood by those having skill in the art.

The longitudinal members 20–23 are preferably pivotally coupled to both the top 12 and bottom 14 of the carrier 10. Providing the longitudinal members 20–23 with pivotal coupling to the top 12 and bottom 14, in combination with a pivotal coupling of the upper 20a–23a and lower 20b–23b portions of the longitudinal member 20–23, allows the longitudinal members to collapse or fold. In such fashion, since the longitudinal members are also preferably attached to the upper 12 and bottom 14 portions of the carrier 10, the carrier 10 may be conveniently collapsed into a fully collapsed state for ease of transportation and/or storage. Significantly, however, this is accomplished without the need to provide any sort of additional hinge within the walls 16–19, other than the placement of hinges at the ends of the walls, discussed above, which are preferably utilized to attach the walls 16–19 to the carrier.

As with all of the pivotal connections employed in the carrier 10, various different configurations may suitably be used to allow the longitudinal members 20–23 to achieve such folding. For example, the longitudinal members 20–23 may be attached to the top 12 and bottom 14 via a simple hinge, either as a separate component or using integrated cooperating features on both the longitudinal members 20–23 and the top 12 and/or bottom 14. It should also be understood that it is not necessary to use the same configuration of pivotal connection for all of the longitudinal members 20–23. Nor is it necessary to use the same configuration of engagement of the longitudinal members at the junction with either the carrier top 12 or carrier bottom 14.

In the exemplary embodiment, the longitudinal members 20–23 are shown being collapsed toward the interior of the carrier 10. Those having skill in the art will appreciate that the longitudinal members may be configured to collapse in other suitable directions. For example, the longitudinal members may be arranged so that they collapse along the edge of the carrier 10. According to such a configuration, longitudinal members 20 and 21 may optionally collapse toward each other and longitudinal members 22 and 23 may also optionally collapse toward each other. Those having skill in the art will therefore appreciate other similar configurations.

The pet carrier 10 may also include a buttress or support feature 30 on the top 12 and/or bottom 14 associated with the general region of coupling with the longitudinal members 20–23. The support feature(s) 30 may optionally be utilized to strengthen the connection with the longitudinal members 20–23. As shown, the support features 30 may be integrally formed with the top 12 and/or the bottom 14. Alternatively, support features 30 may be provided as separate features attachable to the top 12 and or bottom 14.

As best seen in FIGS. 1 and 2, in addition to any reinforcing or strengthening aspect, the support features 30 may also be employed to locate and provide partial housing for the longitudinal members 20–23. In this manner, the walls 16–19 may generally extend between the respective edges of the top 12 and bottom 14, providing a generally smooth viewing transition between the walls 16–19 and the top 12 and bottom 14. This feature of providing a smooth viewing transition between the walls 16–19 and the top 12 and bottom 14 is therefore facilitated by the recess or channels, e.g. 32, in the exterior of the walls 18, 19 in the region of the longitudinal members 16–19.

Figure 4:
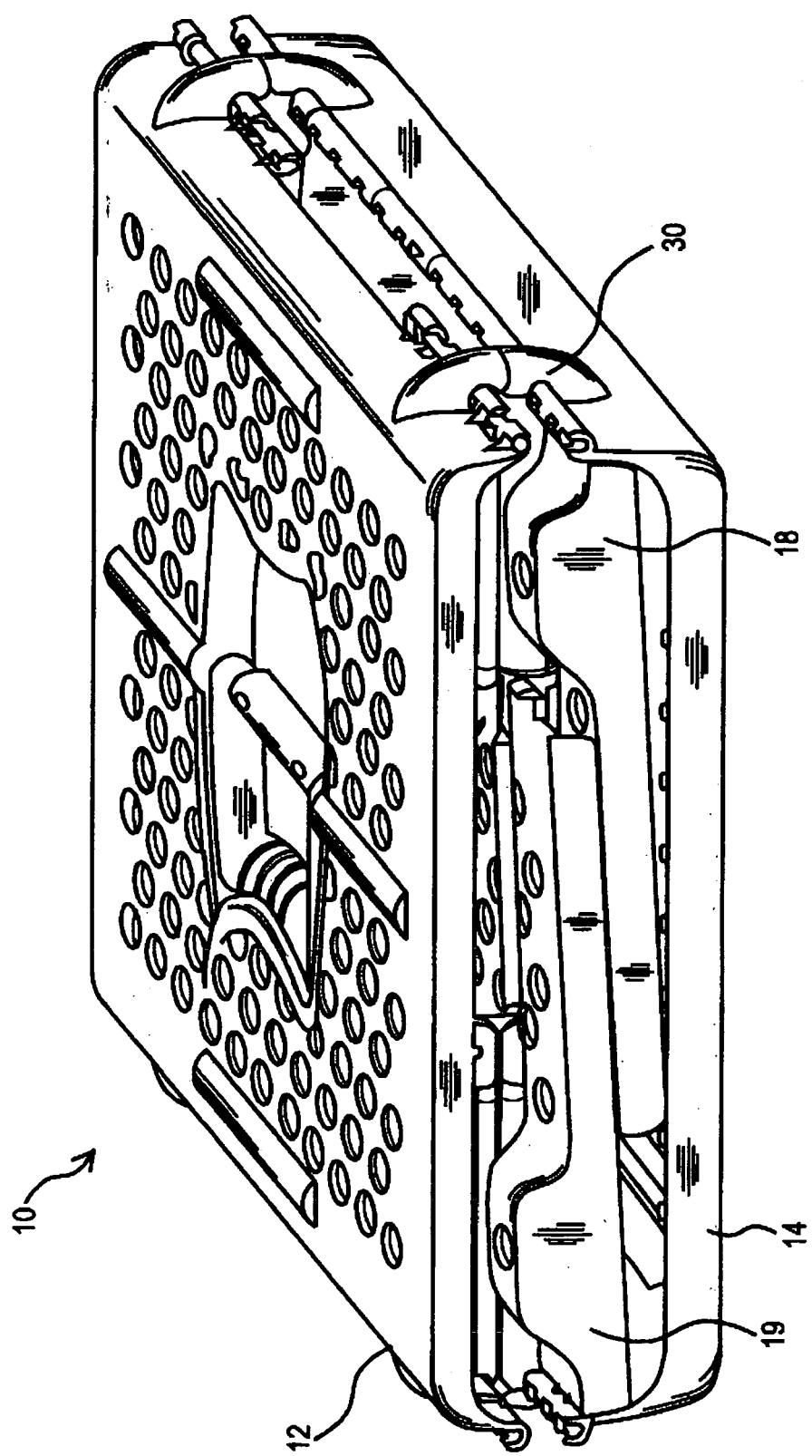
FIG. 4 shows the exemplary pet carrier in a completely collapsed or folded configuration.

Turning to FIG. 4, the pet carrier 10 is depicted in a fully collapsed configuration. Consistent with the preceding description, the exemplary pet carrier 10 may be collapsed by folding the walls 16–19 inward to rest on the bottom 14 or a previously inwardly folded wall. The longitudinal members 20–23 may then be collapsed or folded inwardly at the two pivot locations at the top and bottom as well as the pivot between the upper 20a–23a and lower 20b–23b portions of the longitudinal members 20–23. The longitudinal members preferably align and rest within the recesses or channels 32. When the longitudinal members 20–23 are collapsed in this manner the top 12 of the pet carrier 10 may be collapsed downwardly toward the bottom 14. As shown in FIG. 4, in a fully collapsed condition the walls 16–19 may be stowed between the top 12 and bottom 14 and all of the components may be arranged in a generally parallel orientation. Accordingly, in the fully collapsed condition the pet carrier 10 may have a generally planar configuration that may be more easily stored, transported, etc. Furthermore, as illustrated in FIG. 4, the support features 30 in both the top and bottom of the carrier preferably align with one another when in the collapsed state.

Figure 5:
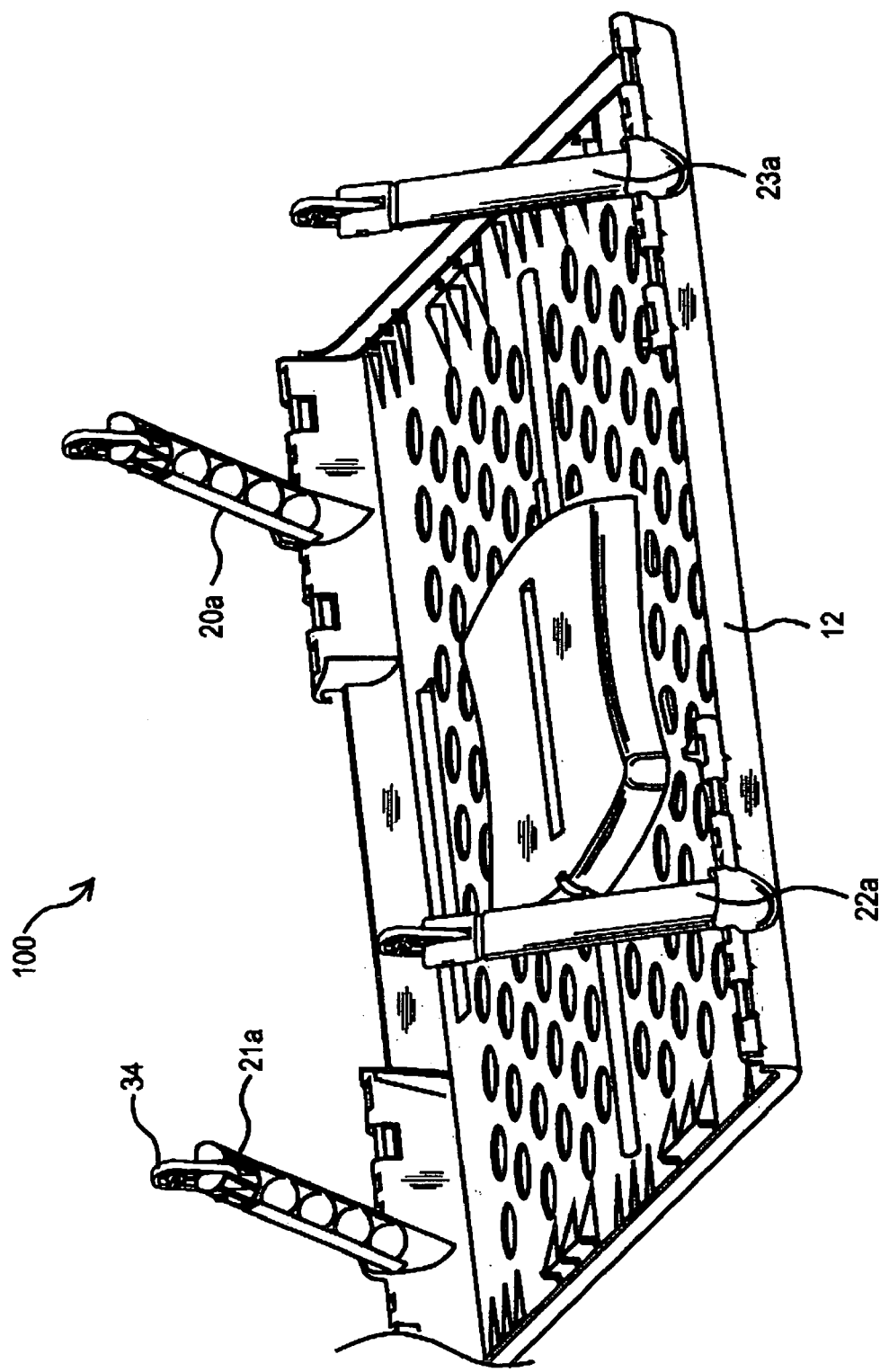
FIG. 5 is a perspective view of the "inside" of an exemplary top sub-assembly of a structure consistent with the present invention.

Consistent with one particular exemplary and preferred embodiment, the pet carrier 10 may be provided as two sub-assemblies of components. Referring to FIG. 5, a first sub assembly is shown including a top 12 of the pet carrier 10. The sub-assembly 100 may also include the upper portions 20a–23a of the longitudinal members coupled to the top 12. In the drawing the upper portions 20a–23a of the longitudinal members are shown including pivot features 34 that may be used to pivotally couple the upper portions 20a–23a of the longitudinal members to the lower portions 20b–23b.

Figure 6:
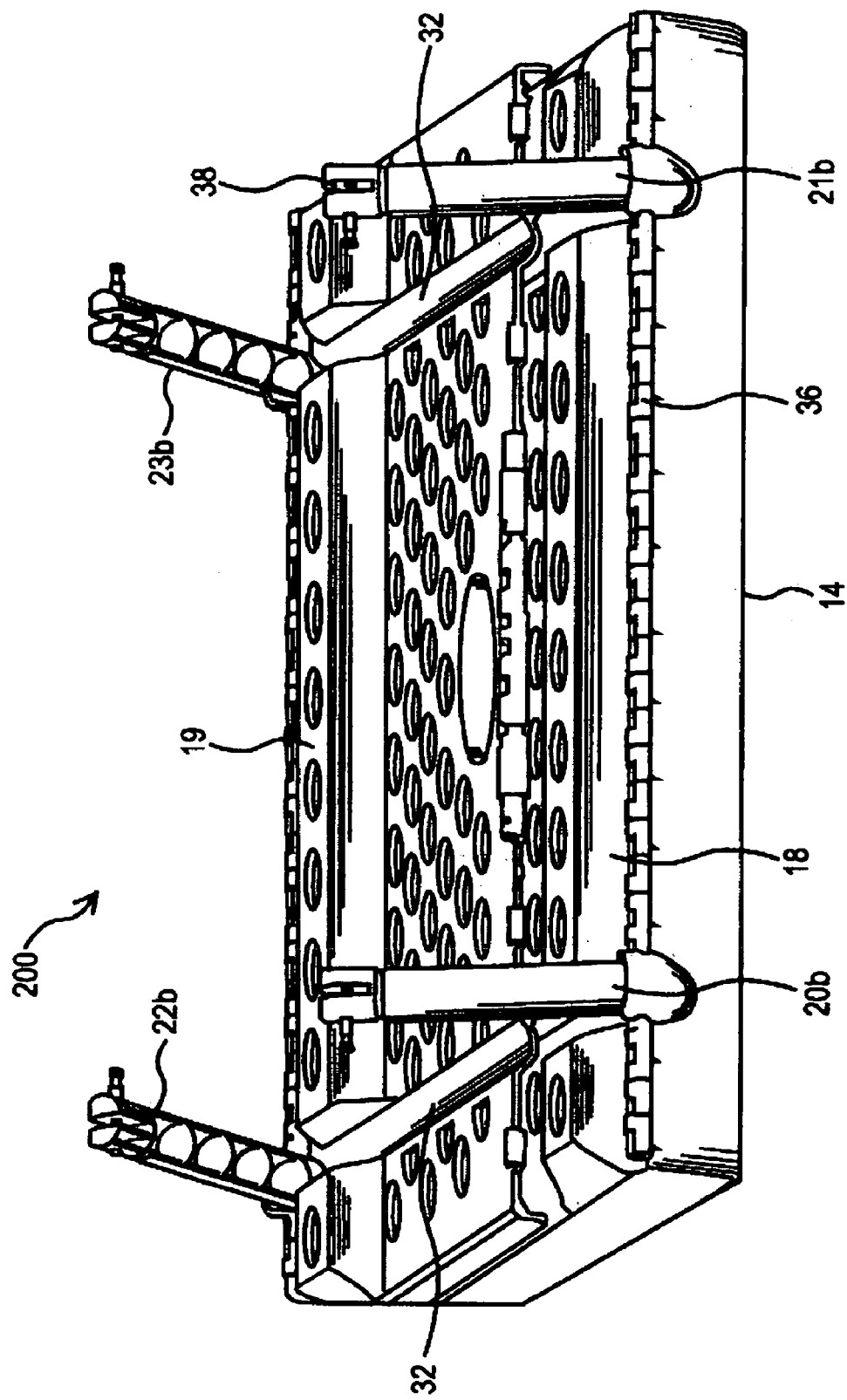
FIG. 6 shows an exemplary bottom sub-assembly having the walls folded inward.

FIG. 6 shows an exemplary second sub-assembly 200 that may be assembled with the first sub-assembly to provide a complete pet carrier 10 consistent with the present invention. The second sub-assembly 200 may include the bottom 14, the walls 16–19, and the lower portions 20b–23b of the longitudinal members. In the illustrated exemplary second sub-assembly 200 the walls 16–19 may be pivotally coupled to the bottom 14 by a hinge 36 extending along the generally the entire length of the wall. As shown, the hinge 36 may include cooperating features on the bottom 14 and the walls 16–19. A pin or rod may be used as a hinge pin, thereby forming a piano hinge style arrangement. Of course, numerous alternative features and methods may be used to pivotally couple the walls 16–19 to the bottom.

In FIG. 6, the channels 32 that may be provided in the walls 16–19 for accommodating the longitudinal members are again visible. Accordingly, as noted above, the channels may also receive the lower portions 20b–23b of the longitudinal members when they are in an inwardly folded configuration. If the walls 16–19 are provided without channels 32 the carrier may still compact. The lower portions 20b–23b of the longitudinal members in the illustrated second sub-assembly may include corresponding slots 38 adapted to be coupled with the pivot features 34 associated with the upper portions 20a–23a of the exemplary first sub-assembly.

Figure 7:
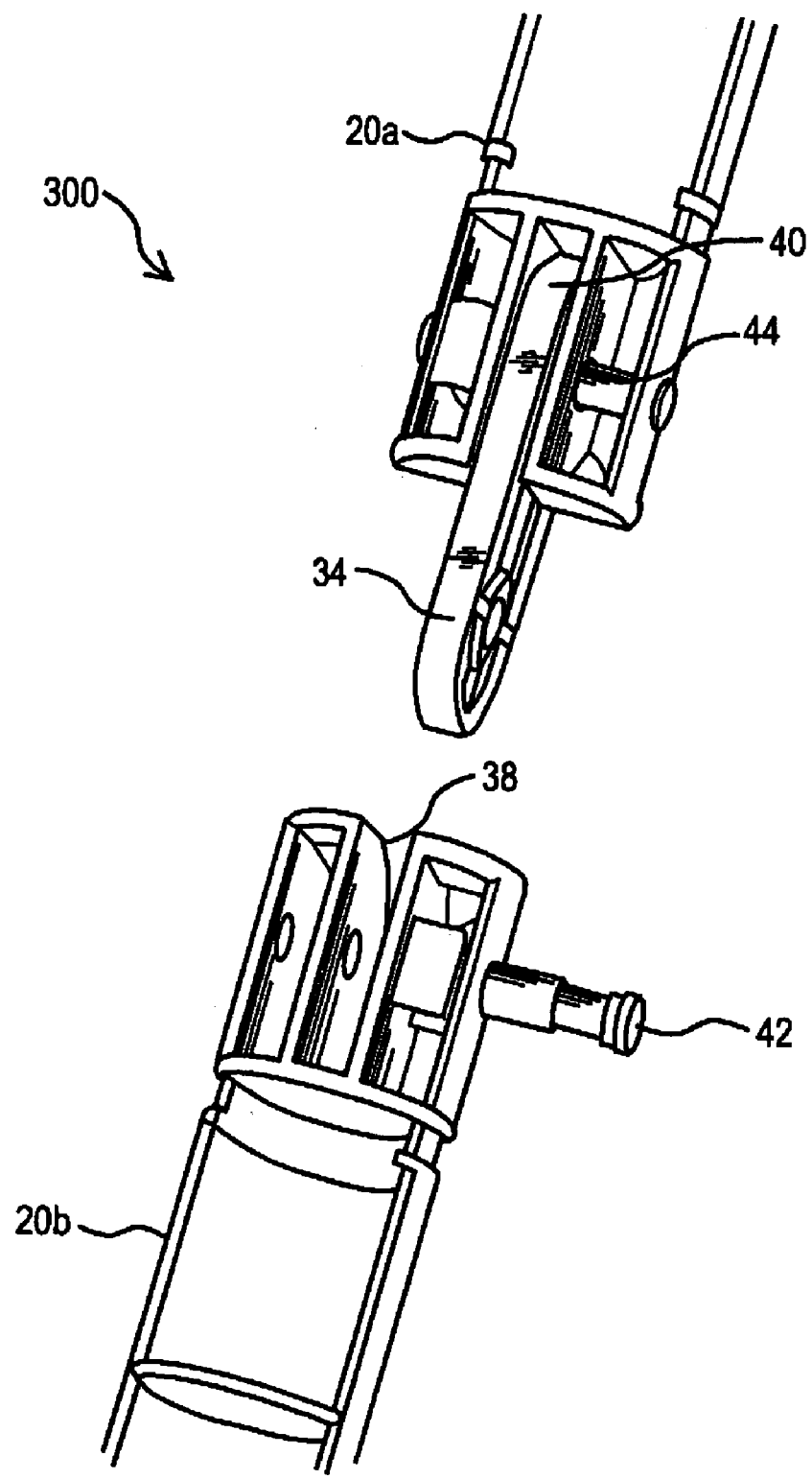
FIG. 7 depicts on exemplary pivot arrangement between the upper and lower portions of a longitudinal member consistent with the present invention.

FIG. 7 illustrates an exemplary pivot assembly 300, employed by the preceding exemplary first and second sub-assemblies 100 and 200. The pivot assembly 300 may include a pivot feature 34 that may be received in a slot 40 in the upper portion 20a–23a of each longitudinal member and a slot 38 in the lower portion 20b–23b of each longitudinal member that is adapted to also receive the pivot feature 34. As shown, the pivot feature 34 may generally be a member including two spaced apart holes. The pivot feature 34 is sized to be received in a slot 38, 40 respectively in the upper and lower portions 20a–23a, 20b–23b of the longitudinal member. A pin 42, 44 may then be inserted passing through each portion 20*a*–23*a*, 20*b*–23*b* and the pivot feature 34. The pins 42, 44 may be removed to allow the disassembly of the carrier 10 into the subassemblies 100 and 200 (see again FIGS. 5 and 6). The exemplary pivot assembly 300 allows each portion 20*a*–23*a*, 20*b*–23*b* of the longitudinal members 20–23 to pivot relative to the pivot feature. Accordingly, the exemplary pivot assembly 300 allows the upper and lower portions 20*a*–23*a*, 20*b*–23*b* to pivot relative to provide for the collapsibility features of the carrier 10, noted herein.

When the exemplary pet carrier 10 is in an expanded configuration, such as shown in FIG. 1, the longitudinal members 20–23 may be disposed against, and/or supported by, the walls of the carrier 10. As noted, the longitudinal members 20–23 may then be configured to collapse inwardly. Locating the walls inside the longitudinal members therefore provides a carrier with the structural integrity of a non-folding wall, while nonetheless providing collapsibility characteristics. Accordingly, the walls 16–19 may be formed from a generally rigid or self-supporting material. For example, the walls 16–19 may be rigid plastic, wooden, or metal panels. As such, the walls 16–19 extending between the top 12 and the bottom 14 provide structural integrity to the carrier 10, and as previously noted, need not be hinged apart from their edge locations.

The longitudinal members may also optionally be provided with a locking mechanism to inhibit or resist unintentional pivoting or collapse of the longitudinal members. Those having skill in the art will recognize the numerous suitable features or mechanism may be used to inhibit or resist unintentional pivoting or collapse of the longitudinal members. Exemplary locking mechanism or features may include a sling member, such as a tube, disposed around at least a portion of the longitudinal members. The sliding member may therefore be positioned around the pivot location of the longitudinal members and extend between the upper and lower portion of the longitudinal member. Another locking mechanism may include a pin or bar selectively extendable across the pivot location between the upper and lower portions of the longitudinal member.

As discussed above, the longitudinal members may include a locking feature to inhibit unintentional collapse or folding. Additionally, and as illustrated in FIG. 1, the walls 16–19 are located adjacent to the longitudinal members 20–23 in the direction of folding or collapse of the longitudinal members, thereby resisting unintentional collapse or folding of the longitudinal members. Regardless of the use of such features to inhibit or resist unintentional collapse, when the longitudinal members are in an extended, i.e. un-pivoted condition, the longitudinal members offer their own strength along their longitudinal axis. The longitudinal members also separately provide flexural strength in those directions other than the direction of collapse or folding. Accordingly, the longitudinal members alone are capable of providing structural support and collapsibility characteristics for the foldable/collapsible structure.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims.

What is claimed is:

1. A foldable/collapsible structure that folds and collapses between an open and closed condition, comprising: a top and bottom section, and a plurality of collapsible wall sections extending between said top and bottom sections, said wall sections and said top and bottom sections defining an enclosure, including a longitudinal member extending between said top and bottom section, said longitudinal member containing a pivot connection at a location between said top and bottom section, said pivot connection allowing movement of the top and bottom section relative to one another, so that said foldable/collapsible structure can be configured between said open or closed condition, and said wall sections include an inner and outer surface with respect to the enclosure, and a recess in the outer wall surface, and said longitudinal member extending between said top and bottom section is positionable within said recess.

2. The foldable/collapsible structure of claim 1, wherein said collapsible wall sections have a varying thickness.

3. The foldable/collapsible structure of claim 1, wherein said longitudinal member is positioned within said recess such that a portion of said longitudinal member is also positioned beneath the outer surface of said wall sections.

4. The foldable/collapsible structure of claim 1, wherein said wall sections are releasably coupled to at least one of said top and said bottom section.

5. The structure according to claim 1, wherein each of said wall sections is pivotally coupled to one of said top and said bottom.

6. The structure according to claim 1, further comprising a door in one of said wall sections.

7. The structure according to claim 1, further comprising a door in said top section.

8. The structure according to claim 1, wherein said longitudinal members are positioned on the exterior surface of said wall sections.

9. The structure of claim 1, wherein each longitudinal member comprises an upper portion pivotally coupled to a lower portion.

10. The structure according to claim 9, wherein said upper portion and lower portion are separable.

11. The structure according to claim 10, said upper and lower portions comprising releasable cooperating hinge features.

12. The structure according to claim 10, wherein said longitudinal members comprise a lock inhibiting pivotal movement of the upper portion relative to the lower portion.

13. The structure according to claim 1, wherein each longitudinal member is releasably attached to said top and bottom section.

14. A foldable/collapsible structure that folds and collapses between an open and closed condition, comprising: a top and bottom section, and a plurality of collapsible wall sections extending between said top and bottom sections, said wall sections and said top and bottom sections defining an enclosure, including a longitudinal member extending between said top and bottom section, said longitudinal member containing a pivot connection at a location between said top and bottom section, said pivot connection allowing movement of the top and bottom section relative to one another, so that said foldable/collapsible structure can be configured between said open or closed condition, and a support feature on said top or bottom section, wherein said support feature provides a housing for said longitudinal member.

15. A foldable/collapsible structure that folds and collapses between an open and closed condition comprising:

a first sub-assembly comprising a top and an upper portion longitudinal member pivotally coupled to said first sub-assembly;
a second sub-assembly comprising a bottom and a lower portion longitudinal member pivotally coupled to said second sub-assembly;
a plurality of collapsible wall sections extending between said first and second sub-assembly, said wall sections and said first and second sub-assembly defining an enclosure, wherein said wall sections include an inner and outer surface with respect to said enclosure, and a recess in the outer wall surface, and said longitudinal member extending between said top and bottom section is positionable within said recess;
said upper portion longitudinal member configured to pivotally couple to said lower portion longitudinal member to allow movement of the top and bottom section relative to one another, so that said foldable/collapsible structure can be configured between said open or closed condition.

16. The structure according to claim 15, wherein said collapsible walls are pivotally coupled to said second sub-assembly comprising the bottom of said collapsible structure.

17. The structure according to claim 16, wherein said collapsible walls are pivotally coupled to said second sub-assembly by a hinge associated with said collapsible wall sections.

18. The structure according to claim 17, said hinge comprises cooperating hinge features on said wall sections and said second sub-assembly.

* * * * *